United States Patent
Hong

(10) Patent No.: US 10,266,203 B2
(45) Date of Patent: Apr. 23, 2019

(54) AID STEERING CONTROL APPARATUS

(71) Applicant: MANDO CORPORATION, Gyeonggi-do (KR)

(72) Inventor: Seung Gyu Hong, Gyeonggi-do (KR)

(73) Assignee: MANDO CORPORATION, Gyeonggi-Do (KR)

(*) Notice: Subject to any disclaimer, the term of this patent is extended or adjusted under 35 U.S.C. 154(b) by 201 days.

(21) Appl. No.: 15/372,358

(22) Filed: Dec. 7, 2016

(65) Prior Publication Data

US 2017/0166252 A1 Jun. 15, 2017

(30) Foreign Application Priority Data

Dec. 10, 2015 (KR) ........................ 10-2015-0176298

(51) Int. Cl.
| | |
|---|---|
| *G01C 21/00* | (2006.01) |
| *B62D 6/10* | (2006.01) |
| *B62D 1/16* | (2006.01) |
| *B62D 5/04* | (2006.01) |
| *B62D 6/00* | (2006.01) |
| *B62D 1/20* | (2006.01) |
| *B62D 3/12* | (2006.01) |

(52) U.S. Cl.
CPC .............. *B62D 6/10* (2013.01); *B62D 1/16* (2013.01); *B62D 5/0463* (2013.01); *B62D 5/0472* (2013.01); *B62D 6/008* (2013.01); *B62D 1/20* (2013.01); *B62D 3/12* (2013.01); *B62D 5/0481* (2013.01)

(58) Field of Classification Search
CPC ........ B62D 6/10; B62D 6/008; B62D 5/0472; B62D 5/0463; B62D 1/16; B62D 1/20; B62D 5/0481; B62D 3/12
See application file for complete search history.

(56) References Cited

U.S. PATENT DOCUMENTS

| | | | |
|---|---|---|---|
| 2014/0365077 A1* | 12/2014 | Kariatsumari ....... | B62D 5/0472 701/41 |
| 2016/0152260 A1* | 6/2016 | Bang ...................... | B62D 5/065 180/422 |
| 2016/0167707 A1* | 6/2016 | Lee ....................... | B62D 15/025 701/41 |

(Continued)

*Primary Examiner* — Ian Jen
(74) *Attorney, Agent, or Firm* — Ladas & Parry, LLP

(57) ABSTRACT

The present invention relates to an aid steering control apparatus comprising: a sensing unit configured to sense at least one of a steering angle and a pinion angle, and a rack force; a change amount calculating unit configured to calculate at least one of a steering angle change amount, which is a change of the steering angle, and a pinion angle change amount, which is a change of the pinion angle, and a rack force change amount, which is a change of the rack force; a first carrier calculating unit configured to calculate a first carrier that is a rack force change amount for the steering angle change amount or a rack force change amount for the pinion angle change amount; and a compensating unit configured to calculate a rack force maximum value and a rack force minimum value, which are rack forces of points where a sign of the first carrier is changed by determining the sign of the first carrier, and to compensate for a steering torque based on a difference between the rack force maximum value and the rack force minimum value, and the points.

10 Claims, 13 Drawing Sheets

(56) References Cited

U.S. PATENT DOCUMENTS

2016/0200354 A1* 7/2016 Kimura ................ B62D 5/0472
  701/42
2016/0362102 A1* 12/2016 Honda ..................... B60K 1/02
2017/0036692 A1* 2/2017 Kojo ...................... B62D 5/008

* cited by examiner

AID STEERING CONTROL APPARATUS

CROSS REFERENCE TO RELATED APPLICATION

This application claims priority from Korean Patent Application No. 10-2015-0176298, filed on Dec. 10, 2015, which is hereby incorporated by reference for all purposes as if fully set forth herein.

BACKGROUND OF THE INVENTION

1. Field of the invention

The present invention relates to an aid steering control technology.

2. Description of the Prior Art

The force equal to or bigger than a rack force generated in a wheel should be provided so that a driver changes a steering angle of a vehicle by spinning a steering wheel.

Therefore, a driver driving a vehicle may feel highly fatigued.

In order to reduce fatigue, a steering control apparatus that senses a steering torque input by a driver and compensates for the steering torque based on the input steering torque is developed and commercialized.

In contrast, the height of the steering wheel may be controlled based on the physical condition and comfort of a driver. A bending angle of a cardan joint included in the steering apparatus may be changed according to the height control.

However, the cardan joint that rotates with a bending angle causes a certain change to the steering torque.

There are problems in which a driver may feel a sense of difference in rotating the steering wheel.

SUMMARY OF THE INVENTION

In this background, an aspect of the present invention is to provide an aid steering control apparatus capable of compensating for a certain change caused by a cardan joint, which rotates with a bending angle to a steering torque.

According to an aspect of the present invention, an aid steering control apparatus comprises: a sensing unit configured to sense at least one of a steering angle and a pinion angle, and a rack force; a change amount calculating unit configured to calculate at least one of a steering angle change amount, which is a change of the steering angle, and a pinion angle change amount, which is a change of the pinion angle, and a rack force change amount, which is a change of the rack force; a first carrier calculating unit configured to calculate a first carrier, which is a rack force change amount for the steering angle change amount or a rack force change amount for the pinion angle change amount; and a compensating unit configured to calculate a rack force maximum value and a rack force minimum value, which are rack forces of points where a sign of the first carrier is changed by determining the sign of the first carrier, and to compensate for a steering torque based on a difference between the rack force maximum value and the rack force minimum value, and the points.

According to another aspect of the present invention, an aid steering control apparatus comprises: a sensing unit configured to sense at least one of a steering angle and a pinion angle, and a rack force; a carrier calculating unit configured to calculate a second carrier reflecting a steering angle or pinion angle where the same characteristic of the rack force is generated and repeated next time in a basic triangular wave having the steering angle or the pinion angle as a variable, and to calculate a third carrier equalizing the second carrier to a phase of a rack force waveform for the steering angle or the pinion angle; and a compensating unit configured to calculate a rack force maximum value, which is a rack force of a point where the third carrier is a maximum value, and a rack force minimum value, which is a rack force of a point where the third carrier is a minimum value, and to compensate for a steering torque based on a difference between the rack force maximum value and the rack force minimum value, and the third carrier.

As described above, according to the present invention, an aid steering control apparatus capable of compensating for a certain change caused by a cardan joint rotating with a bending angle to a steering torque may be provided.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE EXEMPLARY EMBODIMENTS

Figure 1:
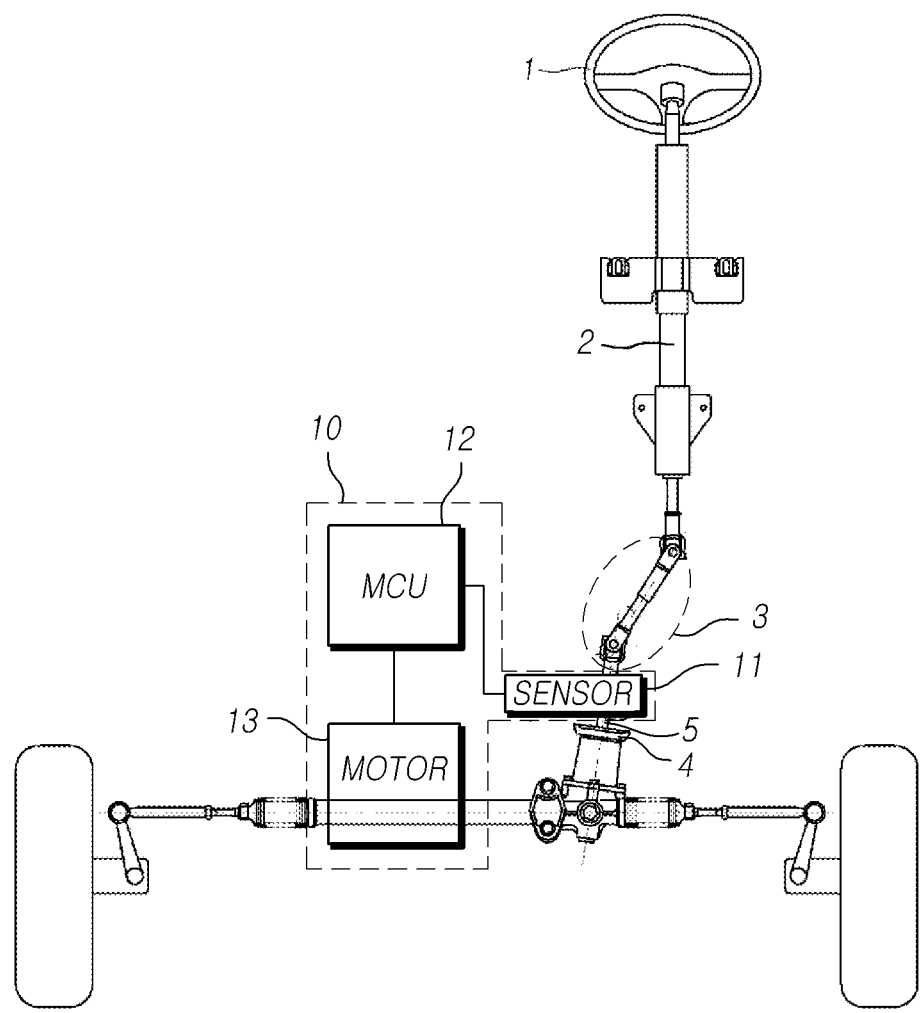
FIG. 1 is a view illustrating an example for describing an operation of a normal steering control apparatus.

Hereinafter, some embodiments will be described with reference to the accompanying illustrative drawings. In designating elements of the drawings by reference numerals, the same elements will be designated by the same reference numerals although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. Each of these terminologies is not used to define an essence, order or sequence of a corresponding component but used merely to distinguish the corresponding component from other component(s). In the case that it is described that a certain structural element "is connected to", "is coupled to", or "is in contact with" another structural element, it should be interpreted that another structural element may "be connected to", "be coupled to", or "be in contact with" the structural elements as well as that the certain structural element is directly connected to or is in direct contact with another structural element.

Figure 2:
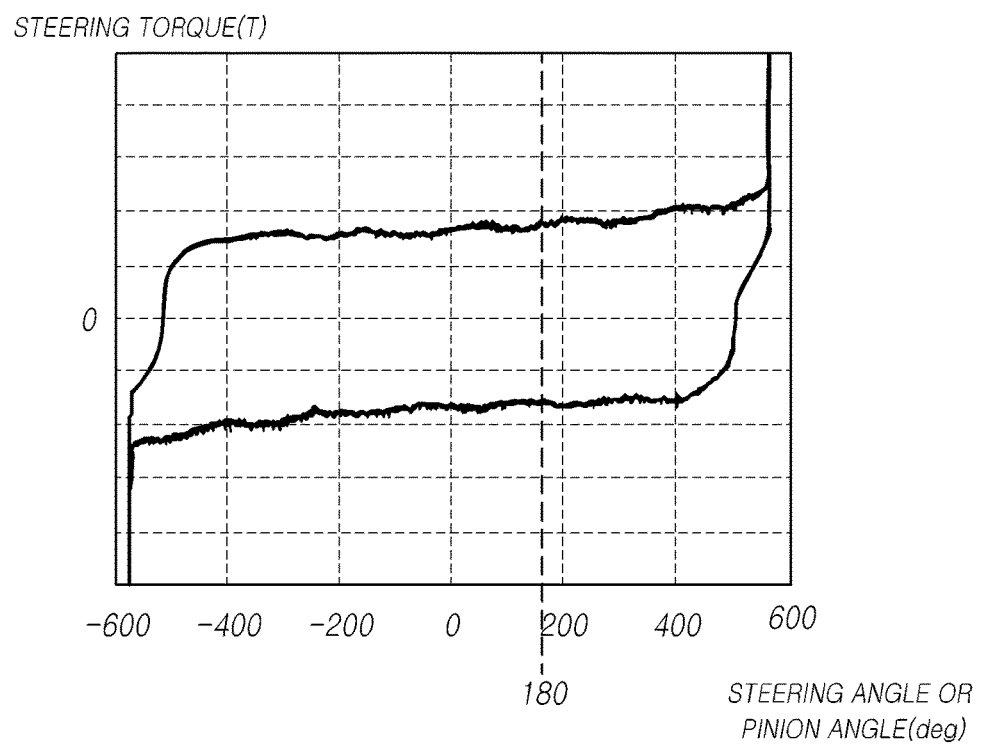
FIG. 2 is a view illustrating an operation waveform of a normal steering control apparatus according to an effect of a cardan joint.

FIG. 1 is a view illustrating an example for describing an operation of a normal steering control apparatus. FIG. 2 is a view illustrating an operation waveform of a normal steering control apparatus according to an effect of a cardan joint.

Referring to FIG. 1 and FIG. 2, in a normal vehicle steering apparatus, when a driver rotates a steering wheel 1 in a desirable direction, a shaft 5 of a steering column 2 connected to the steering wheel 1 spins. The steering column 2 transfers, through a cardan joint 3 including a universal joint, a circulation force to the shaft 5 of a gear box 4 including a rack and a pinion gear.

In the above-mentioned steering apparatus, a normal steering control apparatus 10 is an apparatus in which a torque sensor 11 positioned between a cardan joint 3 and the shaft 5 senses a torque (i.e., an angle difference between an upper end and a lower end of a torsion bar), an MCU 12 generates a driving signal based on the sensed torque, and a motor 13 driven by the driving signal compensates for a steering torque corresponding to a rack force of a rack. Therefore, a driver may rotate the steering wheel 1 in a low power. As shown in FIG. 1, the steering control apparatus 10 may sense a pinion angle to compensate for the steering torque. However, the steering control apparatus 10 may sense the steering angle to compensate for the steering torque.

Hereinafter, it is described that the steering torque is compensated by sensing at least one of the pinion angle and the steering angle. In addition, according to the needs, only the steering angle may be disclosed on behalf of the pinion angle or the steering angle. Since the steering angle of the present exemplary embodiment refers to an operation angle of the steering wheel operated by the driver, the steering angle and the pinion angle may be mutually mixed or replaced.

As described above, the normal steering control apparatus 10 receives the steering angle or the pinion angle as an input and compensates for a torque corresponding to a rack force of a rack. In such an operation, there is a problem wherein a steering torque corresponding to a change (similar to a sine waveform and a cosine waveform which is one kind of trigonometrical function) in which a steering angle or a pinion angle from a time when the same characteristic is generated to a time when the same characteristic is repeated next time on a rack force graph is 180 degrees cannot be compensated. The change of which the steering angle or the pinion angle is 180 degrees is generated by a hardware configuration in which the cardan joint 3 has a certain angle and is rotated.

The steering torque may refer to a torque sensed in a circumstance wherein a driver rotates the steering wheel 1 in a direction or another direction opposite to the direction. In addition, a predetermined angle of the cardan joint 3 may have a different angle according to a position of the steering wheel controlled by the driver according to convenience. The bigger the predetermined angle of the cardan joint 3 is, the bigger the change of the steering torque may be. For example, when a driver rotates the steering whell once (i.e., 360 degrees), the steering torque sensed according to an angle formed by the cardan joint 3 and the shaft 5 includes a variation element by the angle between the cardan joint 3 and the shaft 5 together with a steering torque element according to a steering operation of the driver. That is, a difference between a maximum value and a minimum value of the variation element increases according to an increase of the angle formed by the cardan joint 3 and the shaft 5. In this case, the variation element has a period of 180 degrees. The period is equally maintained regardless of the angle formed by the cardan joint 3 and the shaft 5. The above-mentioned variation element may be extracted in a waveform like a sine or cosine in a section where the steering angle is 180 degrees. Therefore, there is a problem wherein a driver steering torque sensing value for providing an aid steering torque is not generated linearly.

The problems may be generated in any steering control apparatus using the cardan joint 3 as well as the steering control apparatus 10 of an R-EPS type illustrated in FIG. 1.

Hereinafter, an aid steering control apparatus of the present invention that can resolve the problems generated in any steering control apparatus using the cardan joint 3 as well as the steering control apparatus 10 of the R-EPS type illustrated in FIG. 1 is described in detail.

Figure 3:
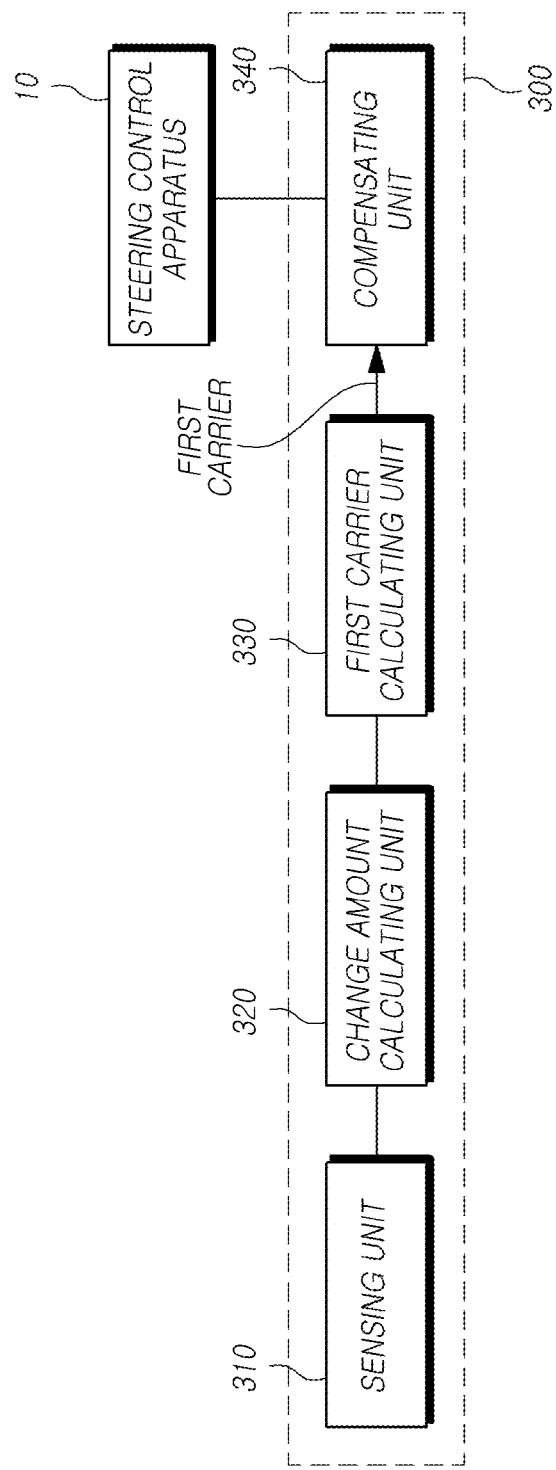
FIG. 3 is a view illustrating a configuration of an aid steering control apparatus according to an exemplary embodiment.

FIG. 3 is a view illustrating a configuration of a configuration of an aid steering control apparatus according to an exemplary embodiment of the present invention.

Referring to FIG. 3, an aid steering control apparatus 300 according to an exemplary embodiment may include: a sensing unit 310 configured to sense at least one of a steering angle and a pinion angle, and a steering torque; a change amount calculating unit 320 configured to calculate at least one of a steering angle change amount which is a change of the steering angle and a pinion angle change amount which is a change of the pinion angle, and a steering torque change amount which is a change of the steering torque; a first carrier calculating unit 330 configured to calculate a first carrier that is a steering torque change amount, which is a steering torque change amount for the steering angle change amount or a steering torque change amount for the pinion angle change amount, and a compensating unit 340 configured to calculate a steering torque maximum value and a steering torque minimum value, which are steering torques of points where a sign of the first carrier is changed by determining the sign of the first carrier, and to compensate for a steering torque based on a difference between the steering torque maximum value and the steering torque minimum value, and the points.

The aid steering control apparatus 300 may include: a sensing unit 310 configured to sense a steering angle and a steering torque sensed according to a change of the steering angle; a change amount calculating unit 320 configured to calculate a steering angle change amount which is a change of the steering angle in a predetermined steering angle section, and a steering torque change amount which is a change of the steering torque; a first carrier calculating unit 330 configured to calculate a first carrier using the steering torque change amount for the steering angle change amount and a predetermined reference trigonometrical function waveform; and a compensating unit 340 configured to calculate a compensation torque for offsetting the first carrier, by using the first carrier.

The sensing unit 310 may use at least one of a sensor for sensing a steering torque, a sensor for sensing a steering angle and a sensor for sensing a pinion angle according to values (i.e., at least one of a steering angle, a pinion angle, and a steering torque) to be sensed, but is not limited thereto. That is, the sensing unit 310 may calculate values to be sensed based on another or other values rather than the values to be sensed. The detailed description for calculating the steering torque, the steering angle or the pinion angle based on another or other values is out of the point of the present invention, and thus omitted.

The change amount calculating unit 320 may calculate at least one of the change amounts of each of the steering angle and the pinion angle sensed from the sensing unit 310, and the change amount of the steering torque sensed from the sensing unit 310.

The steering angle change amount, the pinion angle change amount and the steering torque change amount may refer to each of the steering angle, the pinion angle, and the steering torque, respectively, during a predetermined equal minute time. As described above, the steering angle change amount, the pinion angle change amount, and the steering torque change amount may refer to the change amount during the same minute time, but are not limited thereto. That is, the steering angle change amount, the pinion angle change amount, and the steering torque change amount may refer to a steering angle change amount, a pinion angle change amount and a steering torque change amount while a factor rather than the minute time is changed minutely.

Alternatively, the change amount calculating unit 320 may calculate the steering angle change amount and the steering torque change amount in a predetermined steering angle section. The steering angle change amount and the steering torque change amount may be calculated interrelatedly. For example, the steering angle may be set as an X-axis and the steering torque may be set as a Y-axis so that the steering angle change amount and the steering torque change amount are calculated interrelatedly.

The first carrier calculating unit 330 may divide the steering torque change amount by the steering angle change amount or divide the steering torque change amount by the pinion angle change amount to calculate a first carrier, which is each of the steering torque change amount for the steering angle change amount or the steering torque change amount for the pinion angle change amount.

Alternatively, the first carrier calculating unit 330 may differentiate the steering torque by the steering angle to calculate the first carrier. That is, the first carrier may be calculated as a trigonometrical function waveform (e.g., a sine function or a cosine function), which is generated by differentiating the steering torque by the steering angle. The first carrier may be calculated in a predetermined steering angle section, and the steering angle section may be set as N times of 180 degrees. Here, N is a positive integer.

Meanwhile, the first carrier may correspond to a steering torque change amount element generated by a combination angle of the cardan joint and the shaft included in a steering driving system in the predetermined steering angle section. Thus, the first carrier may be calculated as the trigonometrical function waveform having a period of the above-mentioned 180 degrees.

Alternatively, the first carrier calculating unit 330 may calculate a phase of the first carrier using a predetermined reference trigonometrical function waveform. For example, a phase difference may be generated between the first carrier, which is calculated using the steering angle change amount and the steering torque change amount, and the reference trigonometrical function configured as a sine waveform. Thus, it is necessary to identify a phase to normalize the first carrier as the sine waveform. Specifically, the first carrier calculating unit 330 may calculate an X-axis shifting value of the reference trigonometrical function waveform by identifying an identity of the predetermined reference trigonometrical function waveform and the first carrier, and may determine the shifting value as the phase of the first carrier. Accordingly, the first carrier may be normalized as the trigonometrical function waveform.

Since the steering angle change amount, the pinion angle change amount and the steering torque change amount calculated from the change amount calculating unit 320 refers to the steering angle, the pinion angle and the steering torque during the minute time or while the factor is changed minutely, respectively, the first carrier calculated from the first carrier calculating unit 330 may correspond to a value generated by differentiating a waveform (i.e., x-axis: steering angle or pinion angle, y-axis: steering torque) illustrated in FIG. 2 with respect to the x-axis.

For example, in the waveform illustrated in FIG. 2, an element according to a structural combination angle of the steering driving system is similar to a sine waveform and a cosine waveform, which are each of a type of the trigonometrical function, the phase of the first carrier may precedes the waveform illustrated in FIG. 2 by 45 degrees. The 45 degrees may be a value based on a characteristic (e.g., a steering angle or a pinion angle from a time when the same characteristic of the steering toque is generated once to a time when the same characteristic of the steering toque is repeated next time is 180 degrees) of the waveform illustrated in FIG. 2.

Thus, a steering torque maximum value corresponding to a ridge of the waveform illustrated in FIG. 2 is a steering torque of a point where a sign of the first carrier is changed from a plus (+) to a minus (−), and a steering torque minimum value corresponding to a valley of the waveform illustrated in FIG. 2 is a steering torque of another point where the sign of the first carrier is changed from a minus (−) to a plus (+).

The compensating unit 340 may calculate the compensation torque by applying a compensation value, which is a trigonometrical function waveform, to the normal steering control apparatus 10, based on the above-mentioned characteristic. Here, the trigonometrical function waveform has a maximum value, which is a half value of a difference between the steering torque maximum value and the steering torque minimum value in another point where the sign of the first carrier is changed from the minus (−) to the plus (+), and a minimum value which is a half value of a negative value in the point where the sign of the first carrier is changed from the plus (+) to the minus (−). Accordingly, the aid steering control apparatus according to an exemplary embodiment may resolve the problems caused by the cardan joint illustrated in FIG. 2.

Figure 4:
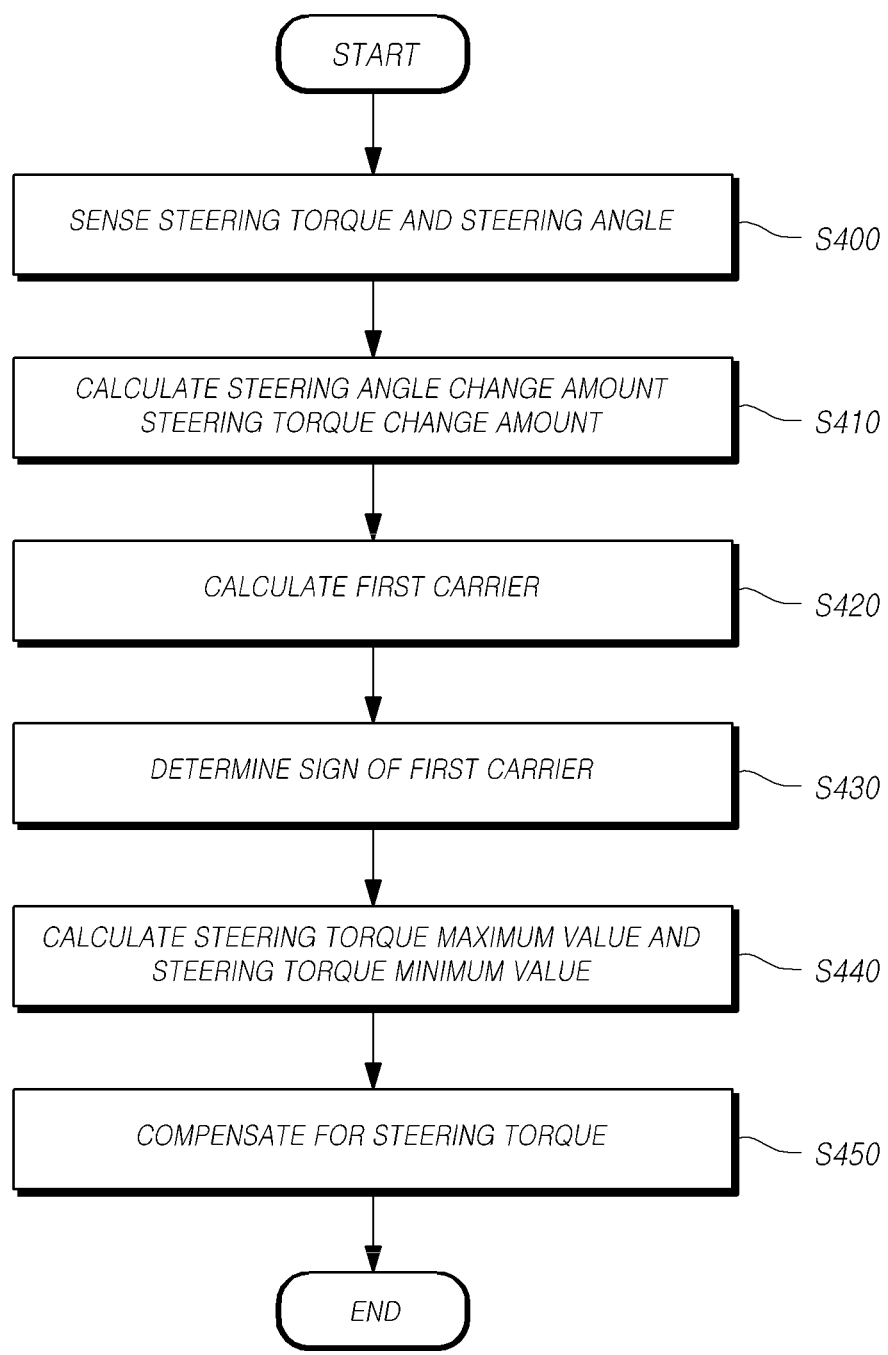
FIG. 4 is a view illustrating an example for describing an operation of an aid steering control apparatus according to an exemplary embodiment.
Figure 5:
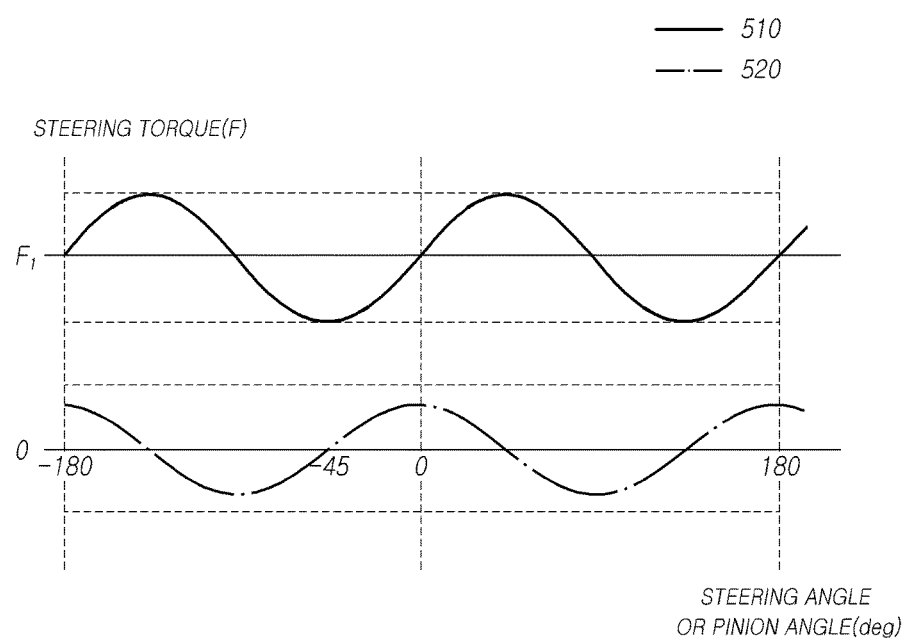
FIG. 5 is a view illustrating an example for describing an operation of a first carrier calculating unit according to an exemplary embodiment.
Figure 6:
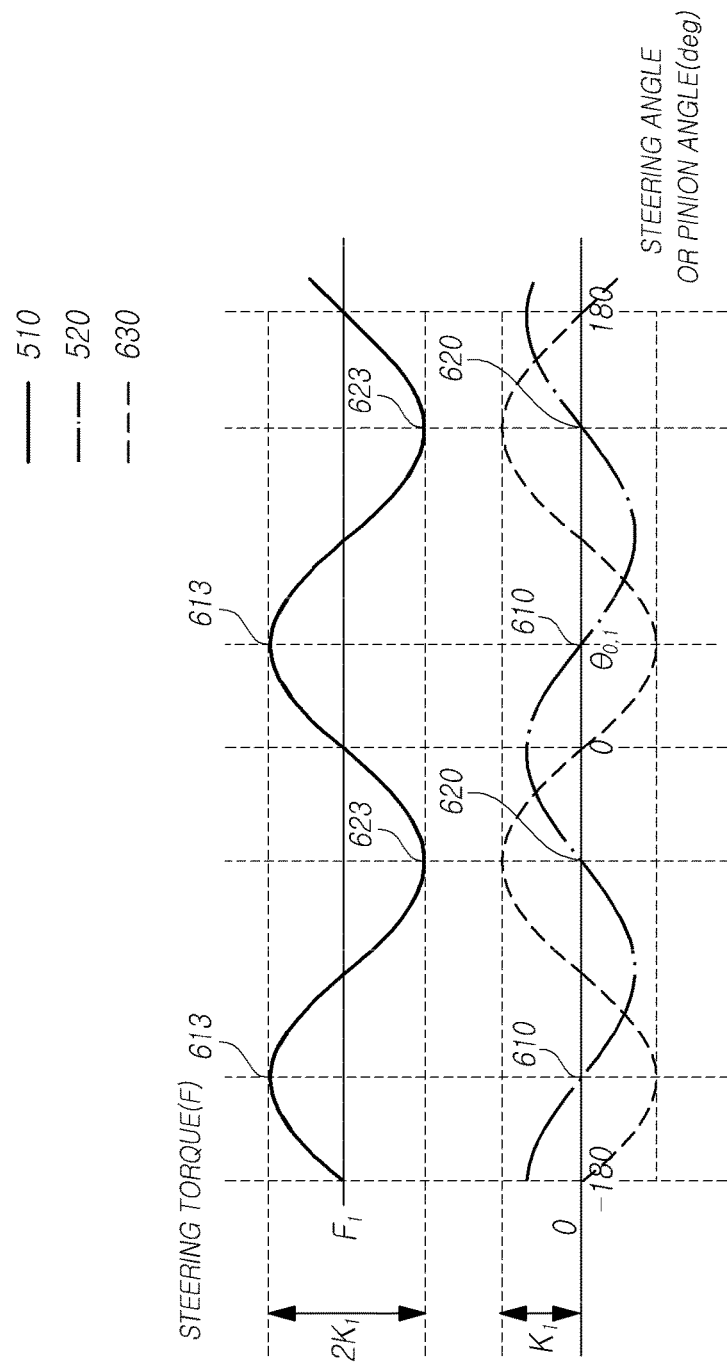
FIG. 6 is a view illustrating an example for describing an operation of a compensating unit according to an exemplary embodiment.

FIG. 4 is a view for describing an operation of an aid steering control apparatus according to an exemplary embodiment. FIG. 5 is a view for describing an operation of a first carrier calculating unit according to an exemplary embodiment. FIG. 6 is a view for describing an operation of a compensating unit according to an exemplary embodiment.

Referring to FIGS. 4 to 6, the aid steering control apparatus according to an exemplary embodiment may sense a steering torque and a steering angle using a sensor by a sensing unit (S400). The steering torque and the steering angle may be sensed using the sensor sensing the steering torque and the steering angle, but the steering torque and the steering angle may be sensed using a sensor sensing a factor different from the steering torque and the steering angle and based on the sensed factor.

When step S400 is performed, a change amount calculating unit according to an exemplary embodiment calculates change amounts of each of the steering torque and the steering angle sensed in step S400. For example, the change amount calculating unit may calculate a difference of the steering torque before and after a predetermined minute time as a steering torque change amount, and may calculate a difference of the steering angle before and after the minute time as a steering angle change amount.

In step S410, it is described that the steering torque change amount and the steering angle change amount are calculated based on the steering torque and the steering angle before and after the minute time, respectively, but step 410 is not limited thereto. That is, the steering torque change amount may be defined as a difference of the steering torque before and after a minute change of a factor different from the minute time, and the steering angle change amount may be defined as a difference of the steering angle before and after a minute change of the factor.

In step S410, when the steering angle change amount and the steering torque change amount are calculated, the first carrier calculating unit may divide the steering torque change amount by the steering angle change amount to calculate a first carrier which is each of the steering torque change amount for the steering angle change amount or the steering torque change amount for the pinion angle change amount (S420).

Since the steering angle change amount is referred to as the steering angle change before and after the minute time and the steering torque change amount is referred to as the steering torque change before and after the minute time, the first carrier calculated in step S420 may refer to a value obtained by differentiating a waveform of the steering torque (i.e., y-axis) for the steering angle (i.e., x-axis) with respect to the steering angle (i.e., x-axis). This is described in detail with reference to FIG. 5.

FIG. 5 illustrates a waveform 510 including a steering torque change amount element of a sine waveform by a hardware operation of a cardan joint in a circumstance in which a normal steering control apparatus compensates for a steering torque $F_1$, and a first carrier 520 calculated by a first carrier calculating unit based on the waveform 510. With respect to the waveform 510, the first carrier 520 calculated by the first carrier calculating unit may have characteristics in which the steering torque $F_1$ is removed and the phase of the steering angle precedes by 45 degrees. In addition, the amplitude of the first carrier 520 may be twice of that of the waveform, but since the aid steering control apparatus according to an exemplary embodiment does not use the amplitude of the first carrier 520, elements related to the amplitude is unrelated to the aid steering control apparatus according to an exemplary embodiment.

Meanwhile, for example, step S420 is performed, the compensating unit determines a sign of the first carrier (S430). The compensating unit may calculate a maximum value and a minimum value of the steering torque based on the determined sign of the first carrier (S440). In addition, the compensating unit may compensate for a torque element corresponding to a change of a cardan joint included in the steering torque based on the calculated maximum value and the minimum value of the steering torque, and points where the sign of the first carrier is changed (S450).

Referring to FIG. 6, the waveform 510 has a maximum value 613 in a point 610 where the sign of the first carrier 520 calculated based on the waveform 510, which is a steering torque waveform for the steering angle is changed from a plus (+) to a minus (−), and has a minimum value 623 in another point 620 where the sign of the first carrier 520 is changed from the minus (−) to the plus (+).

The compensating unit may compensate for a change by the cardan joint included in the steering torque by applying a compensation value 630, which is a trigonometrical function waveform, to the steering control apparatus, based on the above-mentioned characteristic. Here, the trigonometrical function waveform has a maximum value that is a half value $K_1$ of a difference $2K_1$ between the steering torque maximum value 613 and the steering torque minimum value 623 in another point 620, and a minimum value that is a half value $-K_1$ of a negative value in the point 610. The compensation value ($C_1(\theta)$) 630 may be expressed as the following Equation 1.

$$C_1(\theta) = -K_1 * \cos(2(\theta - \theta_{0,1}))$$ [Equation 1]

Here, a constant 2 is a value reflecting a characteristic in which a steering angle from a time when the same characteristic of the steering torque is generated once to a time when the same characteristic of the steering torque is repeated next time is 180 degrees. $\theta_{0,1}$ means the point 610 where the sign of the first carrier 520 is changed from the plus (+) to the minus (−).

The compensation value ($C_1(\theta)$) 630 expressed as Equation 1 is expressed using a cosine function as a trigonometrical function, but is not limited thereto, and may be expressed using another trigonometrical function.

That is, the aid steering control apparatus according to an exemplary embodiment may resolve problems caused by a hardware operation of the cardan joint, by applying the compensation value ($C_1(\theta)$) 630 in the waveform 510, which is an output of the steering control apparatus to which the hardware operation of the cardan joint is reflected. Here, compensation value refers to a compensation torque.

That is, in a steering apparatus, a torque corresponding to a certain offset $F_1$ included in a rack force is compensated from the normal steering control apparatus, and a torque element corresponding to a sine wave included in the steering torque is compensated from the aid steering control apparatus according to an exemplary embodiment of the present invention. Therefore, the above problems can be resolved.

Meanwhile, as another example, in calculating a compensation torque for compensating for the steering torque, in order to calculate the first carrier as a trigonometrical function waveform, a phase value of the first carrier may be calculated using a phase difference with a reference trigonometrical function waveform. For example, an X-axis shifting value may be calculated of a reference trigonometrical function waveform by identifying an identity of a predetermined reference trigonometrical function waveform and the first carrier, and the shifting value may be determined as the phase of the first carrier. Accordingly, the first carrier may be conducted as the trigonometrical function waveform.

Next, in order to compensate for a phase difference between the first carrier and a steering torque change graph, a phase difference according to a differentiation may be calculated (e.g., it is described as 45 degrees as an example in the above). That is, a certain phase difference may be generated between the first carrier and a steering torque change according to a value obtained by differentiating the steering torque change. Thus, in order to calculate an accurate compensation torque, it is necessary to accurately calculate a compensation torque to be compensated in a specific steering angle. To this end, the phase difference between the steering torque change and the first carrier is compensated.

In addition, in order to calculate the compensation torque, a plurality of points where the first carrier value is 0 are determined, and the size of the compensation torque value is determined using a difference of the steering torque value corresponding to each of the plurality of determined points. For example, a steering torque value in the above-mentioned point where the first carrier value is changed from the positive value to the negative value or from the negative value to the positive value may be identified, and a value of a half of a difference between corresponding steering torque values may be calculated as the compensation torque size.

In the above, the aid steering control apparatus according to an exemplary embodiment, which uses the steering angle and the steering torque as a factor, is described. However, alternatively, the aid steering control apparatus according to an exemplary embodiment may be operated using a pinion angle and the steering torque as a factor.

Figure 7:
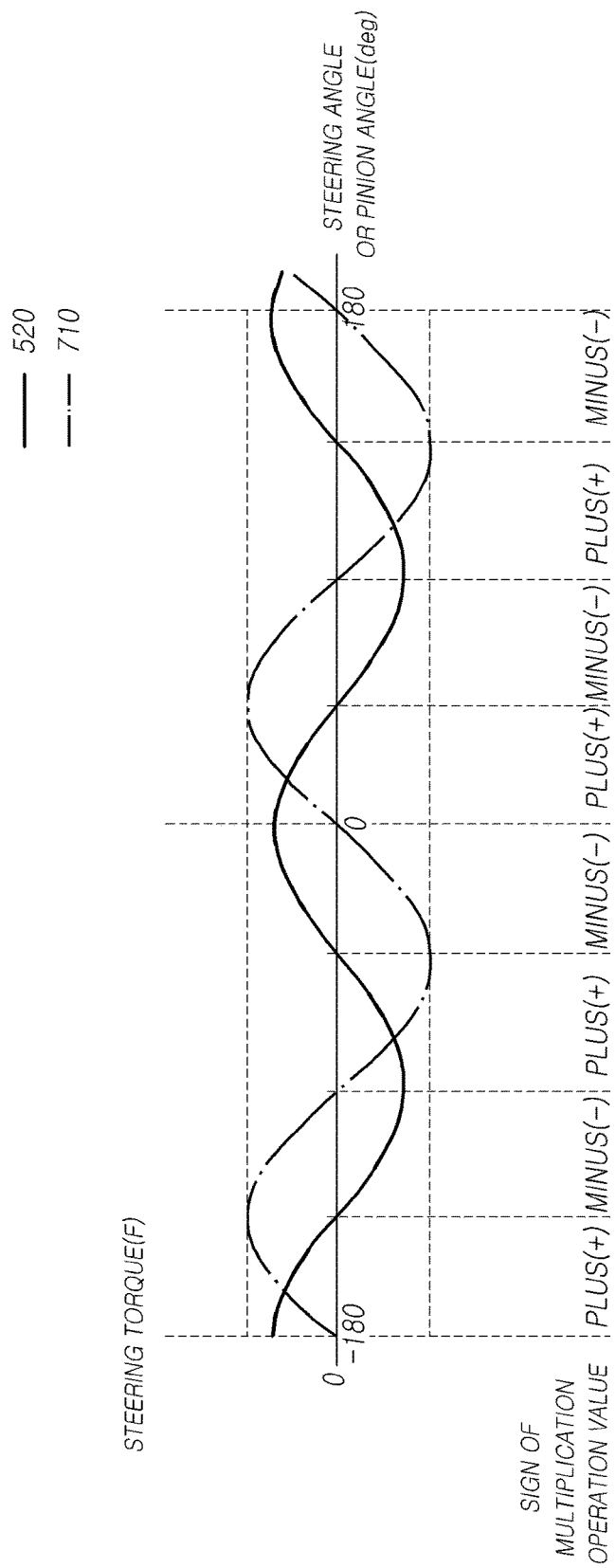
FIG. 7 is a view illustrating another exemplary embodiment for describing an operation of a first carrier calculating unit according to an exemplary embodiment.

FIG. 7 is a view illustrating another exemplary embodiment for describing an operation of a first carrier calculating unit according to an exemplary embodiment.

Referring to FIG. 7, in general, in calculating a first carrier 520 by the first carrier calculating unit, since a steering torque change amount is divided by a steering angle change amount or the steering torque change amount is divided by a pinion angle change amount, signs (i.e., plus (+) and minus (−)) of multiplication operation values of the first carrier 520 and a sine wave 710 element included in the steering torque have the same weight. However, in calculating at least one of a steering angle change amount, a pinion angle change amount, a steering torque change amount and the first carrier by a Micro Controller Unit (MCU), when an error is generated, the first carrier 520 may precede the sine wave 710 included in the steering torque by an angle different from 45 degrees.

In such a circumstance, when a compensating unit calculates a compensation torque based on points where the signs of the first carrier 520 are changed, there are problems in which a steering apparatus may be operated incorrectly due to a compensation value including a steering torque change bigger than a steering torque change caused by a cardan joint.

In order to prevent such an incorrect operation, the first carrier calculating unit may record the signs of the multiplication operation values of the sine wave 710 element included in the steering torque and the first carrier 520, and may move the first carrier to a steering angle axis or a pinion angle axis in parallel so that the signs of the multiplication operation values have the same weight. That is, as described above, the compensation torque may be calculated by calculating the phase difference between the steering torque change and the first carrier.

The weight of the above-mentioned signs may refer to the number of the signs for the steering angle or the pinion angle of a regular interval. For example, when the steering angle or the pinion angle is a regular interval of 15 degrees and the signs of the multiplication operation are recorded, as shown in FIG. 7, the signs of the multiplication operation value recorded from 0 degree to 180 degrees may be {0, plus, plus, 0, minus, minus, 0, plus, plus, 0, minus, minus}. Therefore, the number of the positive values is four and the number of the negative values is four, and thus the weight of the signs is the same.

A sine wave 710 included in the rack force may be a value obtained by removing an offset value from the rack force.

Meanwhile, below, another exemplary embodiment in which a compensation torque is calculated using first carrier is described.

Figure 8:
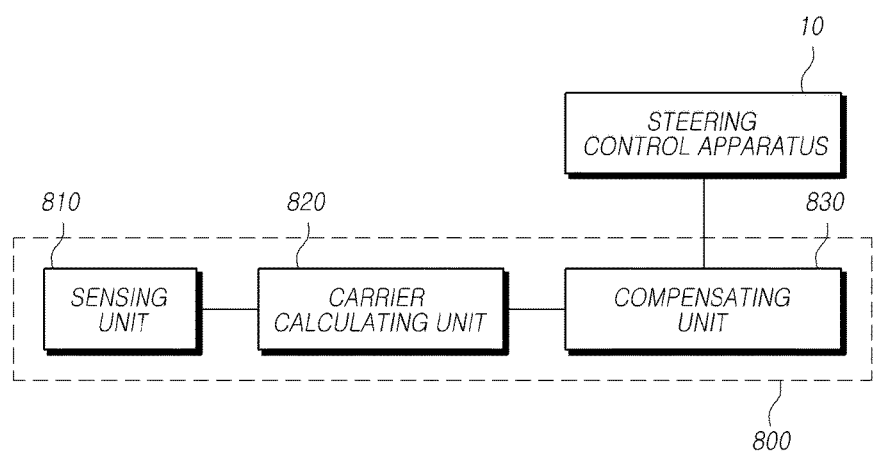
FIG. 8 is a view illustrating a configuration of an aid steering control apparatus according to another exemplary embodiment.

FIG. 8 is a view illustrating a configuration of an aid steering control apparatus according to another exemplary embodiment.

Referring to FIG. 8, an aid steering control apparatus 800 according to another exemplary embodiment may include: a sensing unit 810 configured to sense at least one of a steering angle and a pinion angle, and a steering torque; a carrier calculating unit 820 configured to calculate a second carrier in which a steering torque change amount element according to a steering driving system combination structure in a predetermined steering angle section is reflected to a reference trigonometrical function waveform having the steering angle or the pinion angle as a variable, and a third carrier that is generated by equalizing the second carrier to a phase of a steering torque waveform for the steering angle or the pinion angle; and a compensating unit 830 configured to calculate a steering torque maximum value which is a steering torque of a point where the third carrier is a maximum value and a steering torque minimum value which is a steering torque of a point where the third carrier is a minimum value, and compensate for a compensation torque based on a difference between the calculated steering torque maximum value and the steering torque minimum value, and the third carrier.

The sensing unit 810 may use at least one of a sensor for sensing a steering torque, a sensor for sensing a steering angle and a sensor for sensing a pinion angle according to values (i.e., at least one of a steering angle, a pinion angle, and a steering torque) to be sensed, but is not limited thereto. That is, the sensing unit 810 may calculate the above-mentioned values based on another or other values rather than the values to be sensed.

The carrier calculating unit 820 may calculate the second carrier in which a steering angle or a pinion angle from a time when the same characteristic is generated once to a time when the same characteristic is repeated the next time is reflected to a reference trigonometrical function waveform having the steering angle or the pinion angle as a variable and an amplitude of 1. Next, the carrier calculating unit 820 may calculate the third carrier by moving the second carrier to a steering angle axis or a pinion angle axis in parallel so that each of all signs of multiplication operation values of the second carrier and a sine wave included in the steering torque becomes plus.

As described above, the carrier calculating unit 820 may calculate the third carrier by equalizing the second carrier to the phase of the steering torque waveform for the steering angle or the pinion angle, but is not limited thereto, and any other methods may be applied thereto.

The compensating unit 830 may apply a compensation torque by applying a compensation value to the steering control apparatus 10. Here, the compensation value is obtained by calculating a steering torque maximum value that is a steering torque of a point where the calculated third carrier is a maximum value and a steering torque minimum value that is a steering torque of a point where the calculated third carrier is a minimum value, multiplying a half value of a difference between the calculated steering torque maximum value and the steering torque minimum value to the third carrier, and inverting the value obtained by the multiplication operation.

Accordingly, the aid steering control apparatus according to another exemplary embodiment can resolve problems caused by the cardan joint illustrated in FIG. 2.

Figure 9:
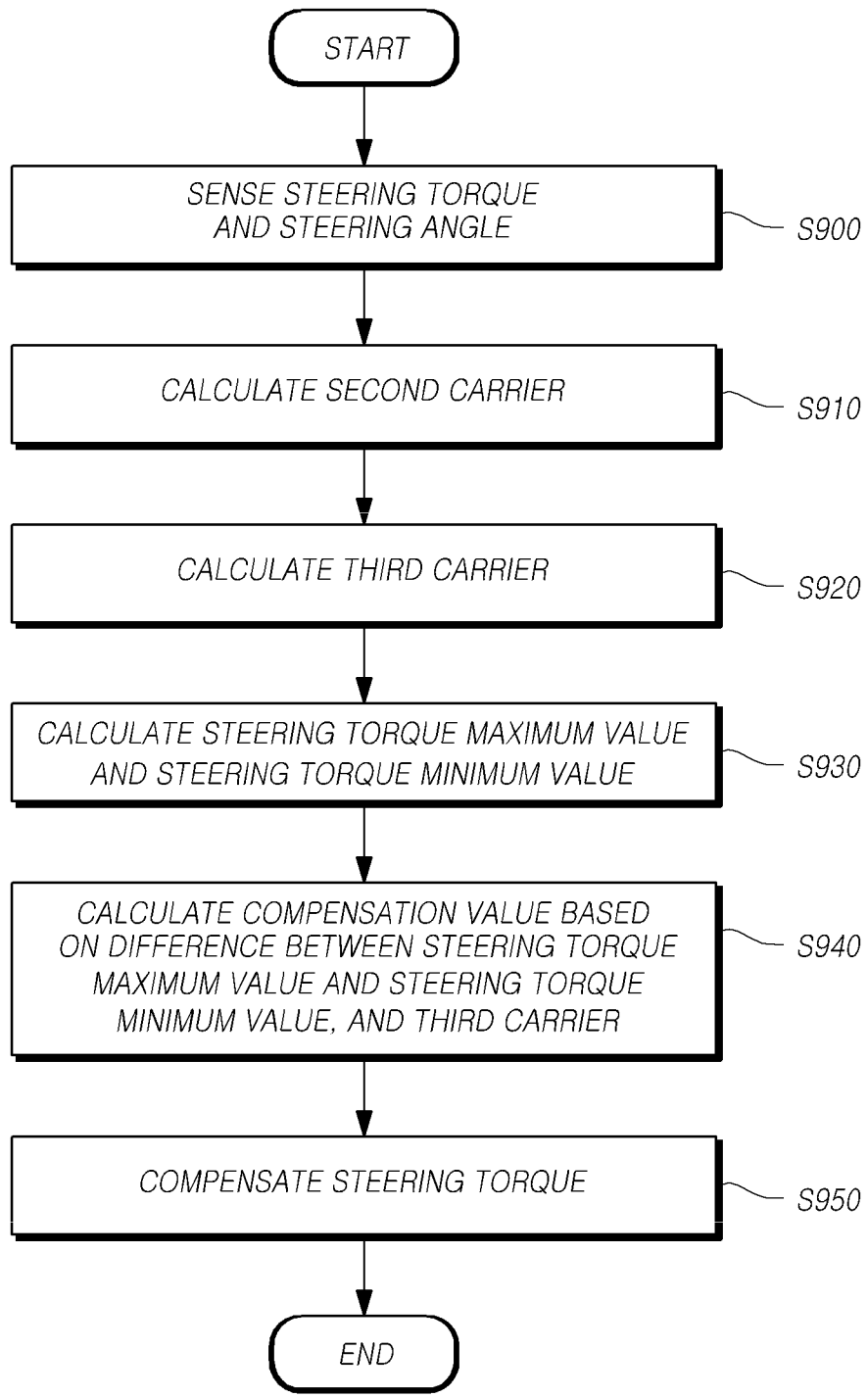
FIG. 9 is a view illustrating an example for describing an operation of an aid steering control apparatus according to another exemplary embodiment.
Figure 10:
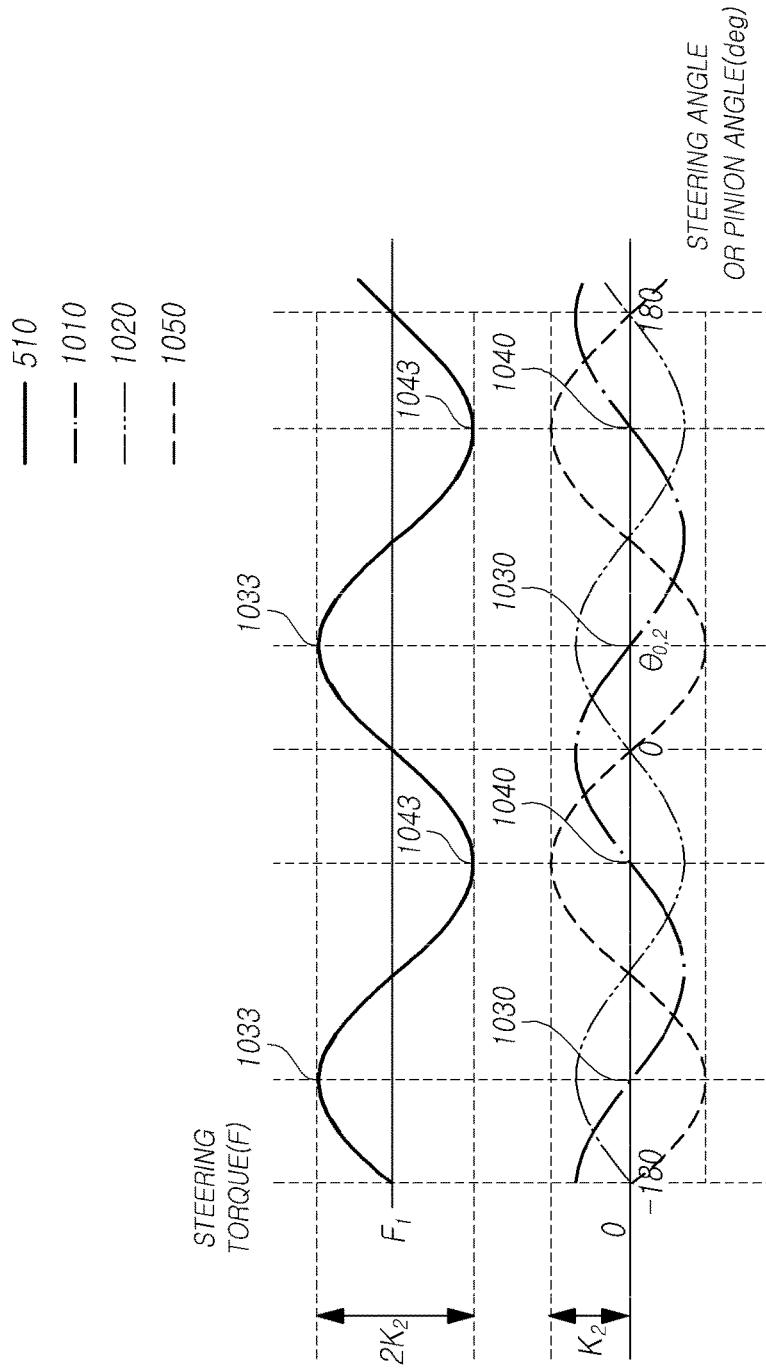
FIG. 10 is a view illustrating an example for describing operations of a carrier calculating unit and a compensating unit according to another exemplary embodiment.
Figure 11:
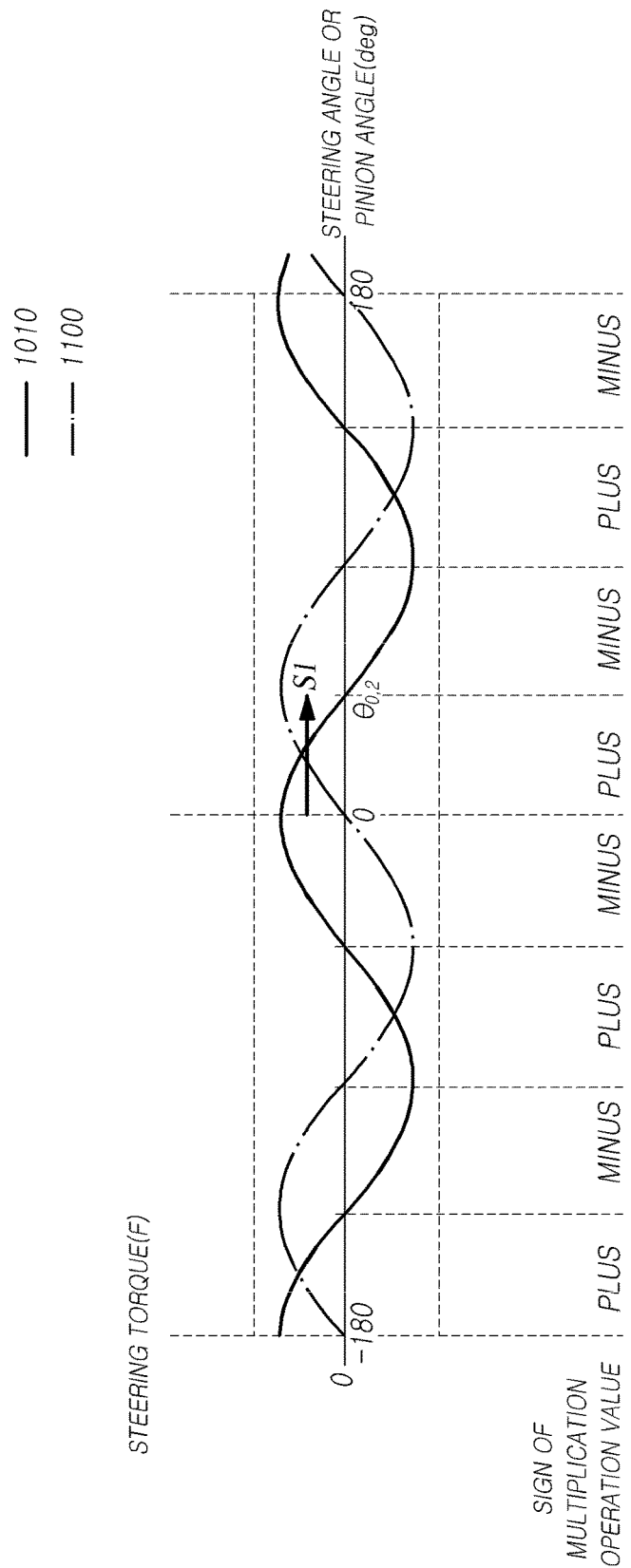
FIG. 11 is a view illustrating another example for describing an operation of a third carrier calculating unit according to another exemplary embodiment.

FIG. 9 is a view illustrating an example for describing an operation of an aid steering control apparatus according to another exemplary embodiment. FIG. 10 is a view illustrating an example for describing operations of a carrier calculating unit and a compensating unit according to another exemplary embodiment. FIG. 11 is a view illustrating another example for describing an operation of a carrier calculating unit according to another exemplary embodiment.

Referring to FIGS. 9 to 11, a sensing unit of an aid steering control apparatus according to another exemplary embodiment may sense a steering torque and a steering angle (S900). The steering torque and the steering angle may be sensed using a sensor sensing the steering torque and the steering angle, but the steering torque and the steering angle may be sensed using a sensor sensing a factor different from the steering torque and the steering angle and using the sensed factor.

When step S900 is performed, the carrier calculating unit may calculate a second carrier (Carri$_2$(θ)) 1010 in which a steering angle or a pinion angle (e.g., 180 degrees) from a time when the same characteristic of the steering torque is generated once to a time when the same characteristic of the steering torque is repeated the next time is reflected to a reference trigonometrical function waveform (e.g., Cos(θ) having the steering angle or the pinion angle as a variable, using Equation 2 (S910).

$$\text{Carri}_2(\theta) = \text{Cos}(2\theta) \qquad \text{[Equation 2]}$$

Here, a constant 2 is a value to which a steering angle or a pinion angle from a time when the same characteristic of the steering torque is generated once to a time when the same characteristic of the steering torque is repeated the next time is 180 degrees is reflected.

The second carrier (Carri$_2$ (θ)) 1010 expressed as Equation 2 is expressed using a cosine function as a trigonometrical function, but is not limited thereto, and may be expressed using another trigonometrical function.

The carrier calculating unit may calculate a third carrier 1020 by equalizing the second carrier 1010 calculated in step S910 to a phase of a steering torque waveform for the steering angle or the pinion angle (S920).

For example, the carrier calculating unit may calculate the third carrier 1020 equalized to the phase of the steering torque waveform for the steering angle or the pinion angle, by recording signs of a multiplication operation value of the second carrier 1010 and a sine wave 1110 included in the steering torque and moving the second carrier 1010 to a steering angle axis or a pinion angle axis in parallel so that each of all of recorded signs becomes plus.

The third carrier (Carri$_3$(θ)) obtained by moving the second carrier 1010 to a steering angle (θ$_{0,2}$) or a pinion angle (θ$_{0,2}$) in parallel by the third carrier calculating unit may be expressed as Equation 3.

$$\text{Carri}_3(\theta) = \text{Carri}_2(\theta - \theta_{0,2}) = \text{Cos}(2(\theta - \theta_{0,2})) \qquad \text{[Equation 3]}$$

When the third carrier 1020 is calculated by performing step S920, the compensating unit may calculate a steering torque maximum value 1033, which is a steering torque of a point 1030 where the third carrier 1020 is a maximum value, and a steering torque minimum value 1043, which is a steering torque of a point 1040 where the third carrier 1020 is a minimum value (S930).

When step S930 is performed, the compensating unit may calculate a compensating torque based on a difference between the steering torque maximum value 1033 and the steering torque minimum value 1043, and the third carrier 1020 (S940), and may compensate for a torque variation phenomenon generated by a cardan joint by inputting the compensation torque to the steering control apparatus (S950).

For example, the compensating unit may apply the compensation torque by inputting the compensation torque 1050 to the steering control apparatus. Here, the compensation torque is obtained by multiplying a half value (K$_2$) of a difference (2K$_2$) between the steering torque maximum value 1033 and the steering torque minimum value 1043 to the third carrier 1020, and inverting the value obtained by the multiplication operation.

The compensation torque (C$_2$(θ)) 1050 input from the compensating unit to the steering control apparatus may be calculated by Equation 4.

$$C_2(\theta) = -K_2 * \text{Carri}_3(\theta) = -K_2 * \text{Carri}_2((\theta - \theta_{0,2})) = K_2 * \text{Cos}(2(\theta - \theta_{0,2})) \qquad \text{[Equation 4]}$$

Meanwhile, the above-described operations for calculating the compensation torque and the first carrier may be performed every predetermined period. Outputs generated in a previous operation may be used between the operations for calculating the compensation torque and the first carrier. Alternatively, the operations for calculating the compensation torque and the first carrier may be performed when a specific event is generated. For example, when a driver controls a tilting of a steering wheel, it may be determined that the above-mentioned specific event is generated. Therefore, the compensation torque or the first carrier may be calculated to replace previous values. This is because it is necessary to newly calculate the compensation torque since a combination angle between a shaft and a cardan joint may be changed through the tilting operation. Besides, an event for a case (e.g., an accident occurrence, a deterioration, and the like) in which the shaft and the cardan joint are changed may be previously stored, and when the previously stored event is generated, the above-mentioned compensation torque or the first carrier may be calculated.

As described above, the aid steering control apparatus according to another exemplary embodiment may resolve problem due to a steering torque change by a hardware operation of a cardan joint illustrated in FIG. 2, by applying the calculated compensation torque (C2(θ)) 1050 to the steering control apparatus to compensate for the steering torque.

Figure 12A:
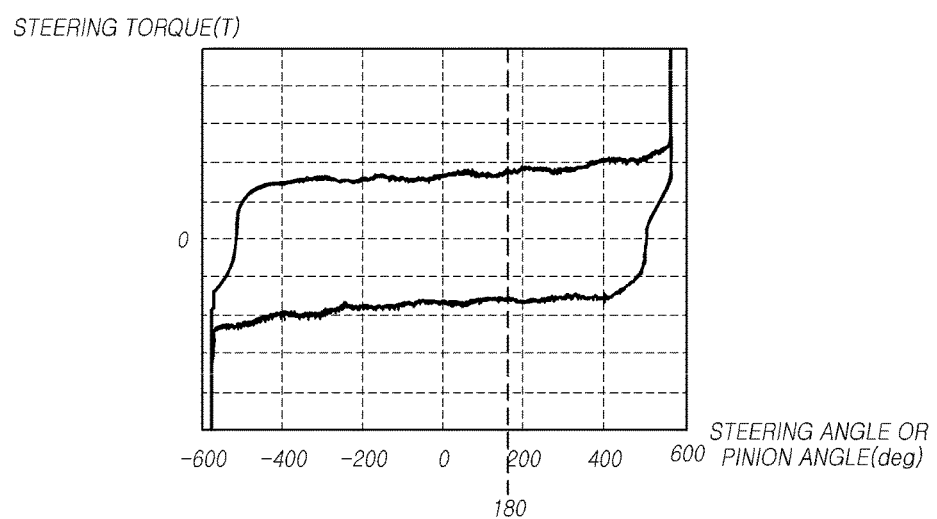
FIGS. 12A and 12B are views illustrating an example for describing an effect by an aid steering control apparatus.
Figure 12B:
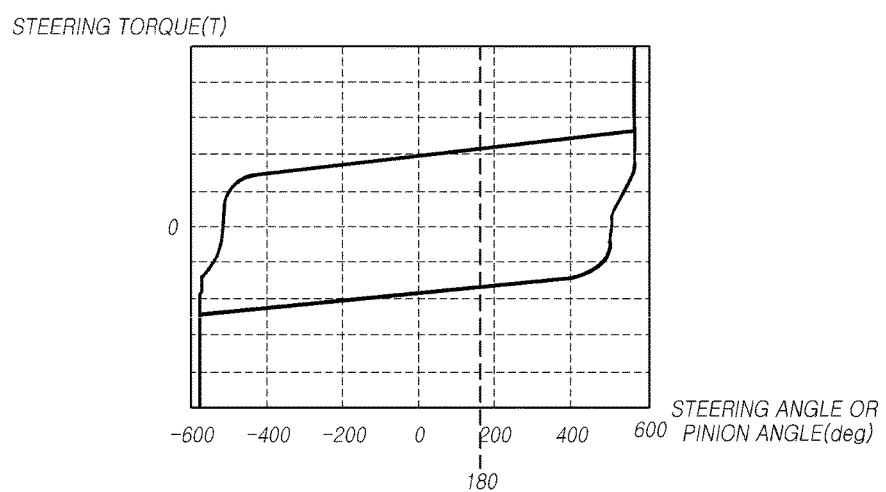

FIGS. 12A and 12B are views illustrating an example for describing an effect by an aid steering control apparatus.

Referring to FIGS. 12A and 12B, a problem in which a steering torque is changed as shown in FIG. 12A by a hardware operation of a cardan joint may be resolved by applying a compensation torque by the aid steering apparatus according to an exemplary embodiment described using FIGS. 3 to 7 and the aid steering apparatus according to another exemplary embodiment described using FIGS. 8 to 11, and thus a steering torque may be output as shown in FIG. 12B. Furthermore, the steering torque as shown in FIG. 12B may be compensated by a normal steering control apparatus.

The above description and the accompanying drawings provide an example of the technical idea of the present invention for illustrative purposes only. Those having ordinary knowledge in the technical field, to which the present invention pertains, will appreciate that various modifications and changes in form, such as combination, separation, substitution, and change of a configuration, are possible without departing from the essential features of the present invention. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

What is claimed is:

1. An aid steering control apparatus comprising:
   a sensing unit configured to sense a steering angle and a steering torque sensed according to a change of the steering angle;
   a change amount calculating unit configured to calculate a steering angle change amount, which is a change of the steering angle in a predetermined steering angle section, and a steering torque change amount, which is a change of the steering torque;
   a first carrier calculating unit configured to calculate a first carrier by using the steering torque change amount for the steering angle change amount and a predetermined reference trigonometrical function waveform; and
   a compensating unit configured to calculate a compensation torque for offsetting the first carrier, by using the first carrier.

2. The aid steering control apparatus of claim 1, wherein the first carrier calculating unit calculates the first carrier, which is a differentiated value of the steering torque change amount in the predetermined steering angle section with respect to the steering angle, as a trigonometrical function waveform.

3. The aid steering control apparatus of claim 1, wherein the first carrier calculating unit calculates a phase of the first carrier using the predetermined reference trigonometrical function waveform.

4. The aid steering control apparatus of claim 3, wherein the first carrier calculating unit calculates an X-axis shifting value of the predetermined reference trigonometrical function waveform by identifying an identity of the predetermined reference trigonometrical function waveform and the first carrier, and determines the shifting value as the phase of the first carrier.

5. The aid steering control apparatus of claim 1, wherein the compensating unit uses a steering torque maximum value corresponding to one point at which a value of the first carrier is changed from a positive value (+) to a negative value (−), and a steering torque minimum value corresponding to one point at which the value of the first carrier is changed from a negative value (−) to a positive value (+), and calculates the compensation torque using the difference value between the steering torque maximum value and the steering torque minimum value.

6. The aid steering control apparatus of claim 1, wherein the compensating unit compensates for a phase difference between the phase of the first carrier and the steering torque change amount, which is generated according to a calculation of the first carrier by differentiating the steering torque change amount, to calculate the compensation torque.

7. The aid steering control apparatus of claim 1, wherein the compensation torque determines the size of the compensation torque using a difference of the value of the steering torque corresponding to a plurality of points where a value of the first carrier becomes zero.

8. The aid steering control apparatus of claim 1, wherein the predetermined steering angle section is set as N times of 180 degrees, and N is a positive integer.

9. The aid steering control apparatus of claim 8, wherein the compensation torque is calculated according to a predetermined period or a change generation event of a combined angle.

10. The aid steering control apparatus of claim 8, wherein the compensation torque is a value that offsets a steering torque change amount element generated by a combination angle of the cardan joint and a shaft.

* * * * *